(12) United States Patent
Matarazzi et al.

(10) Patent No.: US 9,888,804 B2
(45) Date of Patent: Feb. 13, 2018

(54) OVEN COMPRISING WEIGHT SENSORS

(71) Applicant: Indesit Company S.p.A., Fabriano (IT)

(72) Inventors: Filippo Matarazzi, Gualdo Tadino (IT); Carlo Filippo Ratti, Turin (IT); Marco Maria Pedrazzo, Cuneo (IT)

(73) Assignee: Whirlpool EMEA S.p.A., Pero (IT)

( * ) Notice: Subject to any disclaimer, the term of this patent is extended or adjusted under 35 U.S.C. 154(b) by 295 days.

(21) Appl. No.: 14/677,253

(22) Filed: Apr. 2, 2015

(65) Prior Publication Data
US 2015/0305543 A1 Oct. 29, 2015

(30) Foreign Application Priority Data

Apr. 7, 2014 (IT) .............................. TO2014A0292

(51) Int. Cl.
A47J 27/62 (2006.01)
F24C 7/08 (2006.01)

(52) U.S. Cl.
CPC ................. *A47J 27/62* (2013.01); *F24C 7/08* (2013.01)

(58) Field of Classification Search
CPC combination set(s) only.
See application file for complete search history.

(56) References Cited

U.S. PATENT DOCUMENTS

| 4,456,806 | A | * | 6/1984 | Arimatsu | ............ | B29C 35/0288 |
| | | | | | | 219/710 |
| 4,831,239 | A | * | 5/1989 | Ueda | ........................ | H05B 6/64 |
| | | | | | | 219/518 |
| 4,868,357 | A | * | 9/1989 | Serikawa | ............. | H05B 6/6464 |
| | | | | | | 219/706 |
| 5,369,253 | A | * | 11/1994 | Kuwata | ................... | F24C 7/087 |
| | | | | | | 219/400 |
| 6,299,920 | B1 | * | 10/2001 | Saksena | ................. | G01K 11/22 |
| | | | | | | 219/706 |
| 8,563,059 | B2 | * | 10/2013 | Luckhardt | ................. | F24C 7/08 |
| | | | | | | 426/233 |
| 2014/0026762 | A1 | * | 1/2014 | Riefenstein | .......... | H05B 6/6441 |
| | | | | | | 99/325 |
| 2014/0041530 | A1 | * | 2/2014 | Luckhardt | ................. | F24C 7/08 |
| | | | | | | 99/333 |

FOREIGN PATENT DOCUMENTS

| DE | 200 16 793 U1 | 12/2000 |
| DE | 10 2011 009991 A1 | 8/2012 |
| EP | 0 264 935 A2 | 4/1988 |

(Continued)

OTHER PUBLICATIONS

Italian Search Report and Written Opinion dated Aug. 26, 2014 for Italian Patent Application No. TO2014A000292 filed on Apr. 7, 2014 by Indesit Company S.p.A., 9 pages.

*Primary Examiner* — Anne M Antonucci
*Assistant Examiner* — Renee LaRose
(74) *Attorney, Agent, or Firm* — Cesari and McKenna, LLP; Omar M. Wadhwa

(57) ABSTRACT

The present invention relates to an oven (101) comprising a heated cavity (102) for cooking a food (201), supporting means (103) positioned in the heated cavity (102) and configured for supporting a shelf (105) in the heated cavity (102); the supporting means (103) comprise at least one weight sensor (104) configured for detecting the weight of a food (201) positioned on the shelf (105).

8 Claims, 3 Drawing Sheets

(56) References Cited

FOREIGN PATENT DOCUMENTS

| | | |
|---|---|---|
| EP | 1 437 921 A2 | 7/2004 |
| EP | 1 489 887 A2 | 12/2004 |
| EP | 1 918 643 A2 | 5/2008 |
| WO | WO 2007/035851 A2 | 3/2007 |
| WO | WO 2013/092477 A1 | 6/2013 |

* cited by examiner

OVEN COMPRISING WEIGHT SENSORS

CROSS REFERENCE TO RELATED APPLICATIONS

This application claims priority to Italian Application No. TO2014A000292, filed on Apr. 7, 2014, the contents of which are hereby incorporated by reference in its entirety.

TECHNICAL FIELD

The present invention relates to the field of household cooking appliances.

In particular, the invention relates to an oven comprising a heated cavity, with which sensors are associated for detecting characteristics of the foods in the cavity.

PRIOR ART

As is known, preparing food by means of an oven poses a number of problems: since food is cooked in a closed environment, it is always difficult to tell when cooking is complete. In fact, although ovens are usually provided with a door that is at least partially transparent, and with lighting means mounted inside the oven itself, evaluating the actual degree of cooking is still a complex operation.

Moreover, when the user tries to overcome this problem by opening the door to directly observe the food, he/she will risk to interrupt the cooking cycle in an uncontrolled manner, thus making the continuation of the same more difficult and less deterministic, while also risking burns and scalds caused by the high temperature that can be reached inside the oven in operation.

In addition, the user of an oven according to the prior art has no specific information at his/her disposal about the cooking of the food; in particular, in order to determine cooking temperatures and times the user must rely on recipe books. Such recipe books, however, may be inaccurate or anyway inadequate for the specific characteristics of the food, of the oven, or of the interaction between them.

OBJECTS AND SUMMARY OF THE INVENTION

It is the object of the present invention to overcome some of the problems of the prior art.

In particular, it is one object of the present invention to provide a system which allows a more reliable evaluation of the characteristics of the food being prepared, without requiring that the oven door be opened.

It is another object of the present invention to provide a system that allows the user to better evaluate the cooking conditions of the specific food in the oven.

It is a further object of the present invention to provide a system that improves the interaction between the user and the household appliance, so as to make the latter more pleasant to use.

These and other objects of the present invention are achieved through an oven incorporating the features set out in the appended claims, which are an integral part of the present description.

An idea at the basis of the present invention is to envisage that some characteristics of the food being cooked in the heated cavity of the oven can be detected through suitable sensors and then made available to the user in processed form.

A typology of sensors suitable for this purpose comprises a three-dimensional scanning system configured for acquiring information about the volume and/or shape of a food positioned in the heated cavity of the oven.

The three-dimensional scanning system is preferably arranged in the upper part of the heated cavity; by framing the food, it can reconstruct a three-dimensional model from which it can derive information such as the occupied volume; through a comparison with a database and image recognition algorithms, it is thus possible to identify the typology of the food in the cavity and a typical reference composition thereof, including nutritional values.

A sensor typology suitable for this purpose further comprises at least one weight sensor configured for detecting the weight of a food positioned on a shelf supported by supporting means positioned in the heated cavity of the oven.

The weight sensor incorporated in the oven, preferably associated with the shelf supporting guides, essentially measures the weight of the food positioned on the shelf.

Food typology and weight are important parameters that describe in a complete manner the food contained in the oven.

The user can thus obtain important information about the food in the oven, the cooking conditions, and the nutritional values of such food. With such information, the user can intervene, if necessary, in order to modify/stop/improve the cooking operation.

It is clear that the three-dimensional scanning system and the weight sensor may advantageously cooperate to define a plurality of pieces of information associated with the food; however, it should be taken into account that these two systems may also operate independently, in which case, of course, the returned information will cover a narrower range. In the following description a preferred but non-limiting embodiment will be described, wherein the three-dimensional scanning system and the weight sensor coexist in the same oven, resulting in advantages that will be immediately apparent.

Further particular and advantageous purposes and aspects of the present invention will be illustrated in the detailed description that follows, in the annexed drawings and in the appended claims, which are an integral part of the present description.

BRIEF DESCRIPTION OF THE DRAWINGS

Some preferred and advantageous embodiments will now be described by way of non-limiting example with reference to the annexed drawings, wherein.

The drawings show different aspects and embodiments of the present invention and, where appropriate, similar structures, components, materials and/or elements in the various drawings are designated by the same reference numerals.

DETAILED DESCRIPTION OF THE INVENTION

Figure 1:
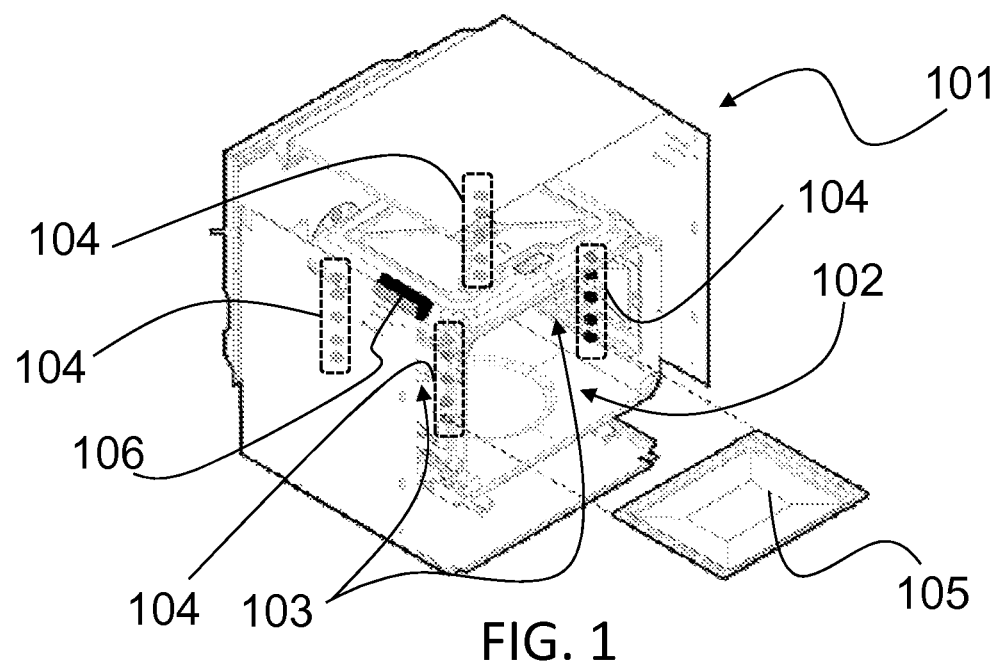
FIG. 1 shows an oven according to the present invention.

FIG. 1 illustrates an oven 101 representing as a whole a system for heating and/or cooking food in accordance with the present invention, of which only those components of most interest will be described herein.

The oven 101 comprises a heated cavity 102, which is heated by heating means (not shown) configured in accordance with known teachings. In particular, the oven 101 is just an explanatory example; as far as the heating means are concerned, this may be an electric or combined oven, but also a gas oven, a microwave oven, etc.

The oven 101 comprises, inside the heated cavity 102, a plurality of supporting means 103, i.e. a plurality of horizontal guides 103, which define support planes for a shelf 105 that can be inserted into the cavity 102.

In the embodiment of FIG. 1, the shelf 105, also referred to as dripping pan 105 or baking pan 105, can be inserted into the cavity 102 at five different heights, defined by respective horizontal guides 103 on the left and right sides of the cavity 102.

The oven 101 comprises at least one weight sensor, which is adapted to detect the weight of a food positioned on the shelf. In particular, the oven 101 comprises a plurality of load cells 104, which are associated with each one of the horizontal guides 103 to detect the weight of the shelf 105 when it is housed inside the heated cavity 102.

The load cells 104 are transducers that convert into an electric signal a force (in this case, the weight force of the shelf 105) to which they are subjected. Preferably, each one of the load cells 104 includes a mechanical assembly, whereby the force to which the load cell is subjected is transferred to a calibrated deformable element; the deformation of the element is measured by transducers, such as extensometers or the like, and possibly compensated for temperature variations in order to obtain the deformation and hence, through calibration, the force to which the load cell is subjected.

Preferably, the oven 101 has four load cells for each one of the various heights of the shelf 105, so as to estimate the weight of the shelf 105 and of the food placed thereon. In particular, the load cells 104 are adapted to measure the total weight of the shelf 105 and of any food present thereon, and to obtain the weight of the food being cooked in the cavity 102 by subtracting the weight of the shelf 105, which is known.

Preferably, the oven 101 includes a multi-cooking mode, wherein two or more shelves are inserted into the heated cavity 102, at different heights, supported by the supporting means 103. On such two or more shelves different foods can be positioned for cooking. The oven 101 is therefore configured for separately detecting the weight of the foods positioned on each one of the shelves, thanks to the plurality of load cells 104 located at respective different heights on the horizontal guides 103. The oven 101 comprises a three-dimensional scanning system 106 positioned in the cavity 102 above the shelf 105, when the latter is in the oven 101.

The three-dimensional scanning system 106 is configured for acquiring information about the volume and/or shape of the food that may be positioned on the shelf 105, in manners that will be described more in detail below.

Of course, the oven 101 is provided with a door that can be opened/closed to allow access to the inside of the confined volume of the heated cavity 102, which door is not shown, for simplicity, in FIG. 1.

Figure 2:
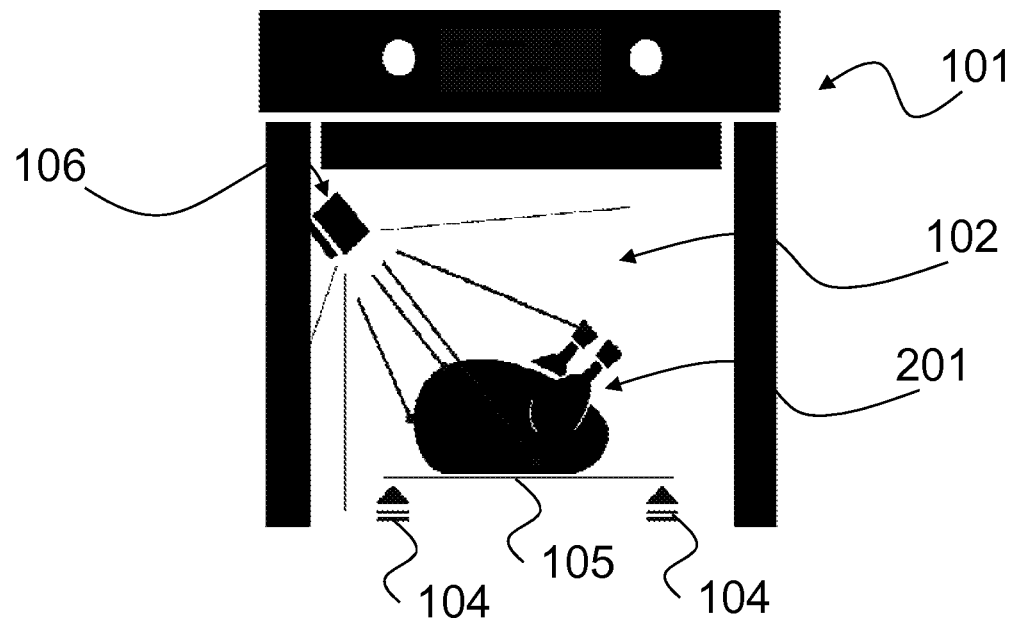
FIG. 2 shows the operation of the oven of FIG. 1, into which a food as been inserted.

FIG. 2 represents the oven 101 in a schematical manner to illustrate the operation thereof.

When food 201 is inserted into the cooking cavity 102 on the shelf 105, its weight is evaluated by the load cells 104 as previously described.

Furthermore, the food 201 is subjected to the measurement carried out by the three-dimensional scanning system 106.

In a preferred embodiment, the three-dimensional scanning system 106 comprises at least one image sensor for framing the food 201, and at least one light source for illuminating the food 201.

In a preferred embodiment, the three-dimensional scanning system 106 envisages the use of three-dimensional object recognition techniques, which allow high-definition scanning of objects arranged close to the sensor. In particular, it is envisaged to use a three-dimensional scanning system of the type called "leap motion", as will be described below.

The three-dimensional scanning system 106 preferably uses two monochromatic infrared (IR) cameras and three infrared (IR) LED light sources. The use of infrared light (in particular, near infrared light) allows illuminating the food 201 with rays that will not disturb the user's vision; on the contrary, they are "transparent" and colorless, resulting in more natural use. Different systems may however also be employed, e.g. operating in the visible light range.

Infrared cameras observe a substantially hemispherical area, at a maximum distance of 1 m from the sensor; such area is illuminated by the infrared LED light sources according to preset patterns. The data processing unit (not shown) of the system 106 can analyze the plurality of images acquired by the IR cameras in different illumination conditions provided by the IR LEDs.

Figure 3:
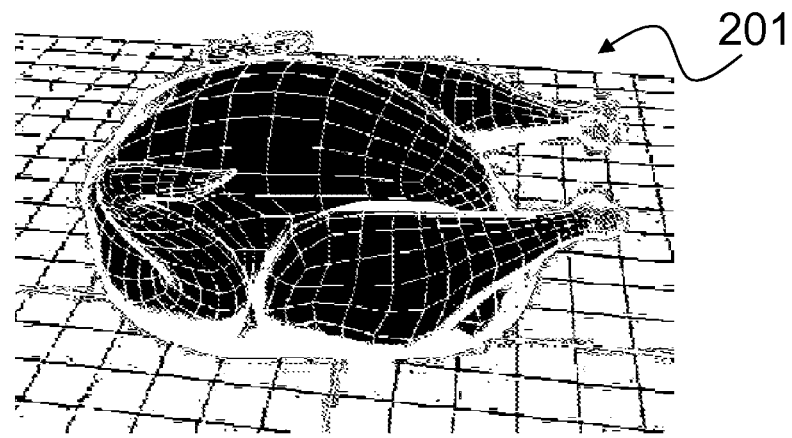
FIG. 3 is a three-dimensional reconstruction of the food of FIG. 2.

As shown in FIG. 3, the system 106 can then reconstruct a three-dimensional image of the food 201 and obtain, through further processing, additional information from the three-dimensional image of the food, as will be described below.

Figure 4:
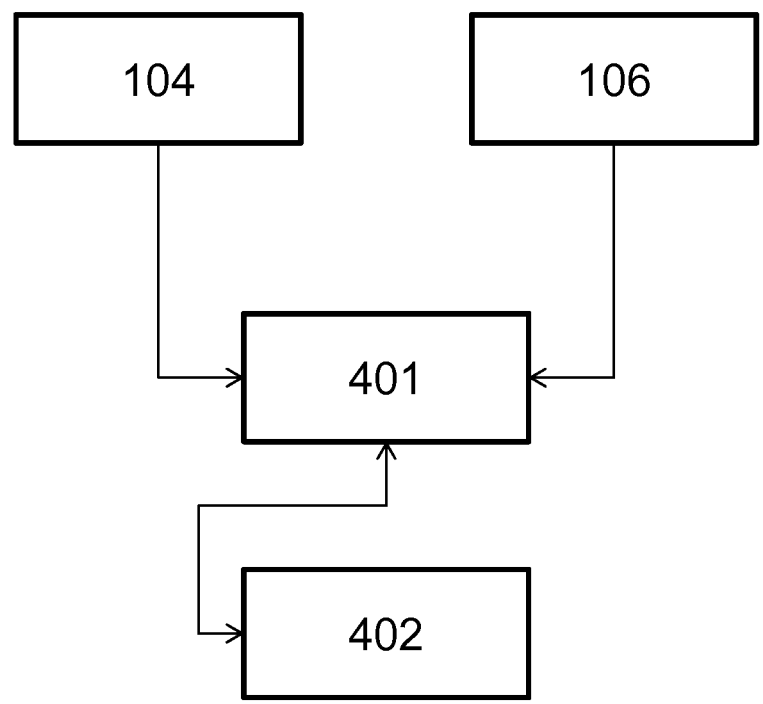
FIG. 4 shows some operating connections between units of the oven of FIG. 1.

As shown in FIG. 4, the oven 101 is associated with processing means 401 operationally connected to the three-dimensional scanning system 106.

The oven 101 is also associated with processing means 401 operationally connected to the load cells 104.

Preferably, the operating connection is established by means of a USB protocol, particularly for the three-dimensional scanning system 106.

The processing means 401, therefore, incorporate weight processing means for the information acquired by the weight sensor.

Likewise, the processing means 401 incorporate three-dimensional scan processing means for the information acquired by the three-dimensional scanning system 106.

The processing means 401 are further operationally connected to a memory 402.

The memory 402 comprises weight reference information, which allows the weight processing means to obtain indications about the weight of the food 201. For example, the weight processing means are adapted to recognize the characteristics of the shelf 105, including its weight, and to calculate the weight of the food 201 by taking into account the correct tare.

The memory 402 comprises reference three-dimensional scan information, which allows the three-dimensional scan processing means to obtain information about the shape and/or volume of the food 201, as previously described with reference to the sensor 106; in this case, the three-dimensional scan processing means integrate all or some of the functions of the above-mentioned data processing unit of the system 106.

The processing means 401 are associated with the oven 101, meaning by this that they may be comprised either in the oven 101 or in a separate electronic device associable therewith through various protocols, even wireless ones. Likewise, the memory 402 is associated with the oven 101, meaning by this that it may be comprised either in the oven 101 or in an electronic device, even a remote one.

Figure 5:
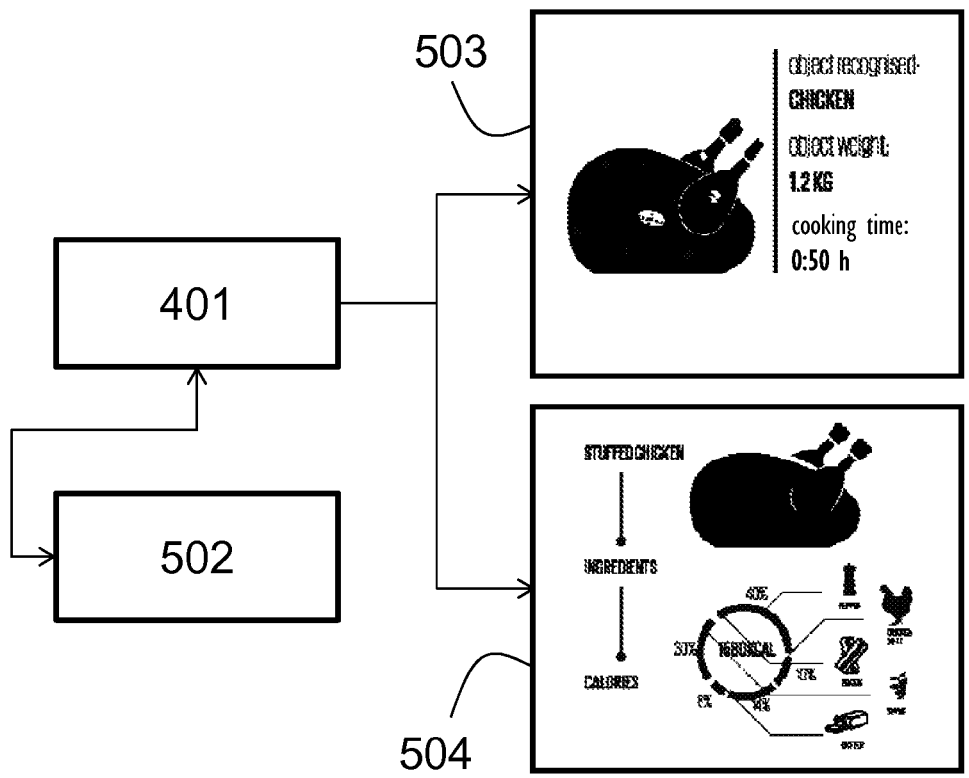
FIG. 5 shows some further operating connections between units of the oven of FIG. 1.

As shown in FIG. 5, the processing means 401 are further associated with a memory 502, which may coincide or not with the memory 402. FIG. 4 is therefore connected to FIG. 5 by the presence of the processing means 401, but such Figures are shown separately for better intelligibility.

The processing means 401 are then adapted to gather further information by comparing the information about the weight of the food 201 acquired by the weight sensor with further information residing in the memory 502. In particular, the processing means 401 are adapted to provide indications about the cooking of the food 201, as shown in the screen 503; in fact, if the weight of a food is known, it becomes possible to estimate the time and/or temperature necessary for cooking it, by referring to appropriate information that can be represented in table form.

The processing means 401 are also adapted to gather further information by comparing the information about the shape and/or volume of the food 201 acquired by the three-dimensional scanning system 106 with further information residing in the memory 502. In particular, the processing means 401 are adapted to provide indications about the typology of the food 201, thus recognizing the type of food (e.g. "chicken, meat, casserole, pie, pizza, etc."). In particular, the processing means 401 are adapted to execute, in association with the information residing in the memory 502, image recognition algorithms for recognizing the typology of the food being observed by the three-dimensional scanning system.

Furthermore, the processing means 401 are also adapted to, by cooperatively exploiting the information gathered by the three-dimensional scan processing means and by the weight processing means, compare the detected volume of a food with the detected weight of a food, in order to obtain the specific weight of the same. It is thus possible, based on the specific weight of a food, to identify in a more accurate manner the type of food inserted in the cavity.

The processing means 401 are further adapted to provide indications about the average nutritional values of the food 201, once it has been recognized, as shown in the screen 504; in fact, if the typology of a food is known, it becomes possible to estimate the nutritional values thereof by exploiting appropriate information that can be represented in table form, particularly when additional information is available, such as the recipe used for cooking the food. The processing means 401 are also adapted to provide indications about the cooking of the food 201, starting from the information gathered by the three-dimensional scanning system 106: in fact, if the volume and typology of a food are known, it becomes possible to estimate the weight thereof and the time and/or temperature necessary for cooking it, by exploiting appropriate average value information that can be represented in table form.

Furthermore, in particular, the processing means 401 are adapted to, by cooperatively exploiting the information gathered by the three-dimensional scan processing means and by the weight processing means, provide the user with more accurate information. Such information comprises: cooking time of a food 201, the typology and weight of which are known; nutritional values of a food 201, the typology and weight and, preferably, the cooking mode of which are known.

In addition or as an alternative, the processing means 401 are configured for determining, based on the data obtained by the three-dimensional scanning system and/or by the weight sensor, one or more of the following characteristic parameters:

a. a first parameter representative of the food typology;
b. a second parameter representative of the food weight;
c. a third parameter representative of the volume occupied by the food;
d. a fourth parameter representative of the food cooking indications, such as time and temperature, and/or, more generally, of the cooking program;
e. a set of parameters representative of a food composition, preferably comprising nutritional values of the food.

Furthermore, in particular, the processing means 401 are adapted to provide the user with information about the time evolution of the food cooking process, particularly by monitoring the variations in weight and/or volume and/or shape of the food over time, as described above. In this way, it is possible to further improve the information about the adopted cooking mode.

Such indications can be represented on a suitable user interface of the oven 101.

Moreover, should the processing means 401 be unable to accurately determine the typology of the food in the cavity, the user may be requested to confirm the food typology, choosing from a list prepared by the processing means 401. When observing croquettes, for example, the processing means 401 will be able to detect the shape and weight of the croquette, but will not be able to accurately determine whether it is a chicken, fish or potato croquette. In such a case, a suitable user interface of the oven 101 will ask the user to give a confirmation indicating the typology of the food present in the cavity, i.e. in this example "chicken croquette" or "fish croquette" or "potato croquette". In this way, it is possible to improve the recognition of the food typology.

Figure 6:
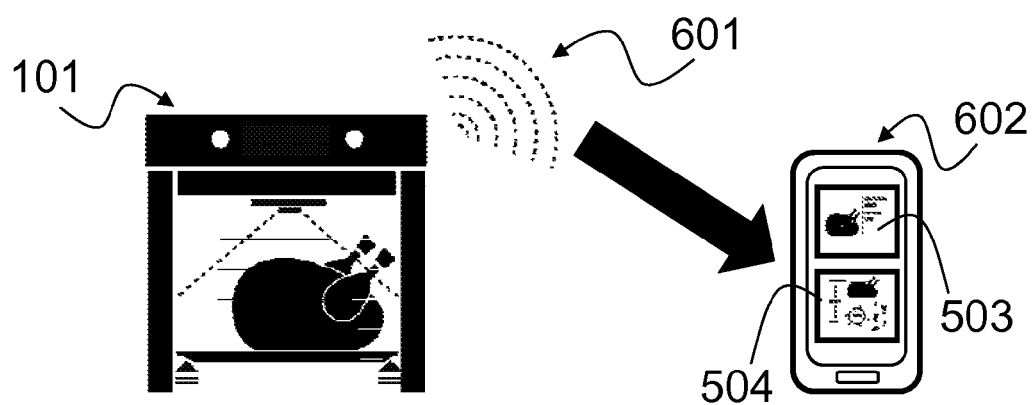
FIG. 6 shows a further operating connection between the oven of FIG. 2 and an associable device.

FIG. 6 illustrates a further variant of the oven 101, which comprises a transmission unit (not shown), preferably a wireless one, adapted to transmit 601 information to a device 602.

The device 602 may advantageously be a display device, by means of which the information transmitted 601 by the oven 101 can be displayed, preferably in the form of an "app". In this embodiment, the processing means 401 are integrated into the oven 101.

In another embodiment, the device 602 may be a processing and display device through which all or some of the information can be processed as described with reference to the processing means 401, while also displaying the information provided by the oven 101, preferably in the form of an "app". In this embodiment, the processing means 401 are at least partially external to the oven 101, in particular at least partially comprised in the device 602.

Preferably, the association between the oven 101 and the device 602 is made in wireless mode, preferably through protocols such as Bluetooth or WiFi, or preferably through IP protocols, also over the Internet.

In the preferred embodiment, the auxiliary device 602 is a smartphone or a tablet, which can be connected to multiple apparatuses or household appliances within a household environment.

It is obvious that, in the light of the teachings of the present description, the man skilled in the art may conceive further variants of the present invention, without however departing from the protection scope as defined by the appended claims.

For example, the three-dimensional scan processing means and the weight processing means may be separated into distinct units.

Also, the load cells may be replaced with various other types of weight sensors, by adopting technical measures known in the art.

The invention claimed is:

1. An oven comprising:
   a heated cavity for cooking a food;
   a horizontal guide positioned in said heated cavity that supports a first shelf in said heated cavity, wherein said horizontal guide includes at least one first weight sensor that detects a weight of the food positioned on said first shelf,
   a processor that compares said weight of the food with reference weight information stored in a memory coupled to the processor; and
   the processor displaying on a display screen an indication about the cooking of said food based on the comparison of the weight of said food with said reference weight information.

2. The oven according to claim 1, further comprising a plurality of other horizontal guides that support a plurality of other shelves at different heights in said heated cavity, wherein the plurality of other shelves include a plurality of other weight sensors.

3. The oven according to claim 2, wherein said plurality of other weight sensors arranged at each height in said heated cavity include a plurality of load cells that detect the weight of the food positioned on the plurality of other shelves.

4. The oven according to claim 1, wherein said processor provides information about the weight of said food netted from a tare weight of said first shelf.

5. The oven according to claim 1, further comprising a three-dimensional scanning system that acquires information about at least one of a volume and a shape of the food positioned in said heated cavity.

6. The oven according to claim 5, wherein said three-dimensional scanning system comprises at least one image sensor positioned in said heated cavity that acquires images of said food, and further comprises at least one light source positioned in said heated cavity that illuminates said food.

7. The oven according to claim 5, wherein the memory stores reference three-dimensional scan information, and wherein the processor is also operationally connected to said three-dimensional scanning system, wherein said processor determines a typology of said food by comparing said information about at least one of the volume and the shape of said food with said reference three-dimensional scan information.

8. The oven according to claim 1, further comprising a transmission unit that sends information about said food to an external device.

* * * * *